(12) United States Patent
Izumi et al.

(10) Patent No.: US 8,247,083 B2
(45) Date of Patent: Aug. 21, 2012

(54) ALUMINIUM ALLOY BRAZING SHEET

(75) Inventors: Takahiro Izumi, Moka (JP); Toshiki Ueda, Moka (JP); Shimpei Kimura, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/099,590

(22) Filed: May 3, 2011

(65) Prior Publication Data

US 2011/0287276 A1   Nov. 24, 2011

(30) Foreign Application Priority Data

May 18, 2010   (JP) .................. 2010-113949
May 18, 2010   (JP) .................. 2010-113950

(51) Int. Cl.
*B32B 15/20* (2006.01)
*F28F 21/08* (2006.01)
(52) U.S. Cl. .... 428/654; 165/905; 148/535; 228/262.51
(58) Field of Classification Search .......... None
See application file for complete search history.

(56) References Cited

U.S. PATENT DOCUMENTS

| | | | |
|---|---|---|---|
| 2006/0035100 A1* | 2/2006 | Goodrich et al. | 428/615 |
| 2009/0324985 A1* | 12/2009 | Tsuruno et al. | 428/576 |
| 2010/0183897 A1* | 7/2010 | Kobayashi et al. | 428/654 |
| 2011/0236717 A1 | 9/2011 | Ueda et al. | |
| 2011/0240280 A1 | 10/2011 | Izumi et al. | |
| 2011/0287277 A1 | 11/2011 | Kimura et al. | |

FOREIGN PATENT DOCUMENTS

| | | |
|---|---|---|
| JP | 2004-17116 | 1/2004 |
| JP | 2010168622 A * | 8/2010 |

OTHER PUBLICATIONS

Lyman et al., Metals Handbook, vol. 8, Metallography, Structures and Phase Diagrams, American Society for Metals, 8th Edition,1973.*
JP 2010-168622 (Machine Translation).*
C. Wolverton, "Crystal Structure and Stability of Complex Precipitate Phases in Al-Cu-Mg-Si and Al-Zn-Mg Alloys", Acta Materialia 49:3129-3142 (2001).*

* cited by examiner

*Primary Examiner* — John J Zimmerman
(74) *Attorney, Agent, or Firm* — Oblon, Spivak, McClelland, Maier & Neustadt, L.L.P.

(57) ABSTRACT

To provide an aluminum alloy brazing sheet which can improve erosion resistance while maintaining post-braze strength, brazability, formability, corrosion resistance and other properties even when Mg is added to the core material. The aluminum alloy brazing sheet comprises an Al—Si-based or Al—Si—Zn-based filler material cladded on at least one side of a core material. The core material comprises Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities, and has the density of an Mg—Si-based, Al—Mg—Cu-based, Al—Cu—Mg—Si-based intermetallic compound with a particle size smaller than 0.5 μm of 10000/mm2 or higher, or has the density of the Mg—Si-based, Al—Mg—Cu-based and Al—Cu—Mg—Si-based intermetallic compounds with a particle size of 1.0 μm or larger lower than 5000/mm2.

8 Claims, No Drawings

ALUMINIUM ALLOY BRAZING SHEET

TECHNICAL FIELD

The present invention relates to an aluminum alloy brazing sheet with excellent erosion resistance for use in automobile heat exchangers and the like.

BACKGROUND ART

Good erosion resistance (durability to resist erosion of molten filler) is required for aluminum alloy brazing sheets for use in automobile heat exchangers and the like. So far, in a brazing sheet having an Al—Si—Mn—Cu-based core material, for example, as described in JP-A-17116, deposition of dissolution elements such as Mn and Si has been suppressed by not performing a homogenizing process of the core material to coarsen the crystal grains in the post-braze core material heating and improve erosion resistance. In addition, Mg has been added to the core material to improve post-braze strength.

However, in brazing sheets produced by adding Mg to a core material, Mg—Si-based, Al—Mg—Cu-based or Al—Cu—Mg—Si-based intermetallic compounds may be produced depending on the heat treatment conditions during the manufacturing process. It has therefore been impossible to sufficiently improve erosion resistance by conventional methods only.

SUMMARY OF THE INVENTION

The present invention has been made in view of such points, and an object of the present invention is to provide an aluminum alloy brazing sheet which can improve erosion resistance while maintaining post-braze strength, brazability, formability, corrosion resistance and other properties even when Mg is added to the core material.

In order to solve the above-mentioned object, the aluminum alloy brazing sheet according to the present invention is an aluminum alloy brazing sheet comprising an Al—Si-based or Al—Si—Zn-based filler material cladded on at least one side of a core material, the core material comprising Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities, and the density of an Mg—Si-based, an Al—Mg—Cu-based and an Al—Cu—Mg—Si-based intermetallic compounds having a particle size smaller than 0.5 μm in the core material being 10000/mm2 or higher.

Such a construction can improve the post-braze strength, brazability and formability of the aluminum alloy brazing sheet by adding a predetermined amount of Si, Mn, Cu and Mg to the core material, and improve the corrosion resistance of the aluminum alloy brazing sheet by adding a predetermined amount of Ti to the core material. In addition, the density of the intermetallic compound having a particle size smaller than 0.5 μm which retards recrystallization by pinning mobile grain boundaries during brazing heating is brought above a predetermined level, whereby the crystal grains of the post-braze core material heating can be coarsened, and the preferential sites of molten filler migration can be reduced.

In addition, the aluminum alloy brazing sheet according to the present invention is an aluminum alloy brazing sheet comprising an Al—Si-based or Al—Si—Zn-based filler material cladded on at least one side of a core material, the core material comprising Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities, the density of an Mg—Si-based, Al—Mg—Cu-based, Al—Cu—Mg—Si-based intermetallic compound having a particle size of 1.0 μm or larger in the core material being lower than 5000/mm2.

Such a construction can improve the post-braze strength, brazability and formability of the aluminum alloy brazing sheet by adding a predetermined amount of Si, Mn, Cu and Mg to the core material, and improve the corrosion resistance of the aluminum alloy brazing sheet by adding a predetermined amount of Ti to the core material. In addition, by restricting the density of the intermetallic compound having a particle size of 1.0 μm or larger which serves as a recrystallization nucleus during brazing heating to fall within a predetermined range, the crystal grains of the post-braze core material heating can be coarsened, and the preferential sites of molten filler migration can be reduced.

In addition, the aluminum alloy brazing sheet according to the present invention is an aluminum alloy brazing sheet comprising an Al—Si-based or Al—Si—Zn-based filler material cladded on one side of the core material and a sacrificial anode material cladded on the other side of the core material, the core material comprising Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities, and the density of an Mg—Si-based, Al—Mg—Cu-based, Al—Cu—Mg—Si-based intermetallic compound having a particle size of 1.0 μm or larger in the core material being lower than 5000/mm2.

Such a construction can improve the post-braze strength, brazability and formability of the aluminum alloy brazing sheet by adding a predetermined amount of Si, Mn, Cu and Mg to the core material, and improve the corrosion resistance of the aluminum alloy brazing sheet by adding a predetermined amount of Ti to the core material. In addition, by restricting the density of the intermetallic compound having a particle size of 1.0 μm or larger which serves as a recrystallization nucleus during brazing heating to fall within a predetermined range, the crystal grains of the post-braze core material heating can be coarsened, and the preferential sites of molten filler migration can be reduced.

According to the aluminum alloy brazing sheet of the present invention, its erosion resistance can be improved even when the sheet has a core material with Mg added thereto.

DESCRIPTION OF EMBODIMENTS

The aluminum alloy brazing sheet according to the embodiment of the present invention will be described below in detail.

(Core Material)

The core material contains Si: 0.3 to 1.0% by mass, Mn: 0.6 to 2.0% by mass, Cu: 0.3 to 1.0% by mass, Mg: 0.15 to 0.5% by mass, and Ti: 0.05 to 0.25% by mass, with the remainder being Al and inevitable impurities. In addition, the core material contains the Mg—Si-based, Al—Mg—Cu-based and Al—Cu—Mg—Si-based intermetallic compounds with a particle size smaller than 0.5 μm at a density of 10000/mm2.

Alternatively, the core material contains Si: 0.3 to 1.0% by mass, Mn: 0.6 to 2.0% by mass, Cu: 0.3 to 1.0% by mass, Mg: 0.15 to 0.5% by mass, and Ti: 0.05 to 0.25% by mass, with the remainder being Al and inevitable impurities. In addition, the core material contains the Mg—Si-based, Al—Mg—Cu-based and Al—Cu—Mg—Si-based intermetallic compounds with a particle size of 1.0 μm or larger at a density lower than 5000/mm2.

(Si: 0.3 to 1.0% by Mass in Core Material)

In the presence of Mg, Si forms Mg2Si, and improves the post-braze strength of the aluminum alloy brazing sheet. However, when the amount of Si is lower than 0.3% by mass, its effect in improving the post-braze strength is low, while when the amount of Si is higher than 1.0% by mass, the solidus temperature of the core material is lowered and the core material is melted during brazing. Therefore, the amount of Si contained in the core material is kept within the range mentioned above.

(Mn: 0.6 to 2.0% by Mass in the Core Material)

Mn forms an Al—Mn—Si-based intermetallic compound, and improves the post-braze strength of the aluminum alloy brazing sheet. However, when the amount of Mn is lower than 0.6% by mass, the effect of Mn in improving the post-braze strength is low, while when the amount of Mn is higher than 2.0% by mass, the amount of the coarse intermetallic compound formed during casting is increased, and formability is lowered. Therefore, the amount of Mn contained in the core material is kept within the range mentioned above.

(Cu: 0.3 to 1.0% by Mass in Core Material)

Cu improves the post-braze strength of the aluminum alloy brazing sheet by dissolving into the core material to form a solid solution. However, when the amount of Cu is lower than 0.3% by mass, its effect in improving the post-braze strength is low, while when the amount of Cu is higher than 1.0% by mass, the solidus temperature of the core material is lowered, resulting in the melting of the core material during brazing. Therefore, the amount of Cu contained in the core material is kept within the range mentioned above.

(Mg: 0.15 to 0.5% by Mass in the Core Material)

In the presence of Si, Mg forms Mg2Si, and improves the post-braze strength of the aluminum alloy brazing sheet. However, when the amount of Mg is lower than 0.15% by mass, its effect in improving the post-braze strength is low, while when the amount of Mg is higher than 0.5% by mass, the amount of Mg which reaches the inside of a flux during brazing heating increases so that the functions of the flux are impaired, resulting in lowered brazability. Therefore, the amount of Mg contained in the core material is kept within the range mentioned above.

(Ti: 0.05 to 0.25% by Mass in Core Material)

Ti forms a Ti—Al-based compound in the Al alloy, and is dispersed in layers. Since this Ti—Al-based compound has a high electric potential (is noble), its form of corrosion is transformed into layers so that the progress of corrosion (pitting) in the direction of thickness is prevented, and corrosion resistance is improved. However, when the amount of Ti is lower than 0.05% by mass, its form of corrosion is transformed into layers. Therefore, its effect in improving corrosion resistance is low. In contrast, when the amount of Ti is higher than 0.25% by mass, a coarse intermetallic compound is formed, resulting in lowered formability. Therefore, the amount of Ti contained in the core material is kept within the range mentioned above.

(Inevitable Impurities in Core Material)

Even if the core material contains inevitable impurities, for example, Cr: 0.2% by mass or lower, Zr: 0.2% by mass or lower, Zn: 0.2% by mass or lower and Fe: 0.3% by mass or lower (each being higher than 0% by mass), the effects of the present invention are not prevented.

(Density of Intermetallic Compound Having a Particle Size Smaller than 0.5 μm: 10000/mm2 or Higher)

In the aluminum alloy brazing sheet according to the embodiment, the density of the Mg—Si, Al—Mg—Cu, Al—Cu—Mg—Si-based intermetallic compounds having a particle size smaller than 0.5 μm in the core material is 10000/mm2 or higher. It should be noted that the particle size of the intermetallic compounds is equivalent to circle diameter.

An intermetallic compound having a particle size smaller than 0.5 μm in the core material retards recrystallization by pinning mobile grain boundaries during brazing heating. That is, when the number of intermetallic compounds having a particle size smaller than 0.5 μm is large, the grain growth during brazing heating is slow, resulting in coarse crystal grains in the core material after the brazing heating. In contrast, when the number of intermetallic compounds having a particle size smaller than 0.5 μm is small, pinning is cancelled in the middle of the brazing heating at, for example, 600° C. and the grain growth proceeds at once, leading to fine crystal grains in the core material after the brazing heating. Herein, the grain boundaries in the core material generally become preferential sites for migration (erosion) by the molten filler. Therefore, when the crystal grains in the core material are coarse, the volume ratio of the grain boundaries is lowered and erosion is unlikely to occur, while when the crystal grains in the core material are fine, erosion is likely to occur.

Herein, when the density of the intermetallic compounds having a particle size smaller than 0.5 μm is 10000/mm2 or higher, the pinning of the mobile grain boundaries is sufficient, resulting in coarse crystal grains in the core material. Therefore, the volume ratio of the grain boundaries which become preferential sites for erosion by the molten filler is lowered, leading to improved erosion resistance. In contrast, when the density of the intermetallic compounds having a particle size smaller than 0.5 μm is lower than 10000/mm2, the pinning of the mobile grain boundaries is insufficient, resulting in fine crystal grains in the core material. Therefore, the volume ratio of the grain boundaries which become preferential sites for erosion by the molten filler is increased, leading to lowered erosion resistance.

(Density of Intermetallic Compounds Having a Particle Size of 1.0 μm or Larger: Lower than 5000/mm2)

In the aluminum alloy brazing sheet according to the embodiment, the density of the Mg—Si, Al—Mg—Cu, Al—Cu—Mg—Si-based intermetallic compounds having a particle size of 1.0 μm or larger in the core material is lower than 5000/mm2. It should be noted that the particle size of the intermetallic compounds is equivalent to circle diameter.

The intermetallic compounds having a particle size of 1.0 μm or larger in the core material serve as recrystallization nucleus during brazing heating. That is, when the number of intermetallic compounds having a particle size of 1.0 μm or larger is large, recrystallization during brazing heating is increased, leading to fine crystal grains in the core material after the brazing heating. In contrast, when the number of intermetallic compounds having a particle size of 1.0 μm or larger is small, recrystallization during brazing heating is decreased, leading to coarse crystal grains in the core material after the brazing heating. Herein, the grain boundaries in the core material generally become preferential sites for erosion by the molten filler. Therefore, when the crystal grains in the core material are coarse, the volume ratio of the grain boundaries is reduced and erosion is unlikely to occur, while when the crystal grains in the core material are fine, erosion is likely to occur.

Herein, when the density of the intermetallic compounds having a particle size of 1.0 μm or larger is lower than 5000/mm2, the amount of recrystallization nucleus is low, resulting in coarse crystal grains in the core material. Therefore, the volume ratio of the grain boundaries which become preferential sites for erosion by the molten filler is lowered, resulting in improved erosion resistance. In contrast, when the density of the intermetallic compounds having a particle size of 1.0 μm or larger is 5000/mm2 or higher, the amount of recrystallization nucleus is high, resulting in fine crystal grains in the core material. Therefore, the volume ratio of the grain boundaries which become preferential sites for erosion by the molten filler is increased, leading to lowered erosion resistance.

The density of the Mg—Si, Al—Mg—Cu, Al—Cu—Mg—Si-based intermetallic compounds in the core material can be determined, for example, by grinding the L-LT plane (rolled plane) of the core material in the ST direction (thickness direction) to the center of the core material from both sides, and observing it by means of a TEM (transmission electron microscope).

(Controlling Conditions of Density of Intermetallic Compounds Having a Particle Size Smaller than 0.5 μm)

The particle size and density of the intermetallic compounds in the core material of the aluminum alloy brazing sheet according to the embodiment can be controlled by setting a coiling temperature after hot rolling to a predetermined temperature, and annealing under predetermined conditions at least once after the hot rolling in the manufacturing process of the brazing sheet. The details are as follows:

(Coiling Temperature in Hot Rolling)

The coiling temperature in hot rolling is lower than 360° C. That is, when the coiling temperature after hot rolling is 360° C. or higher, the intermetallic compounds are grown and coarsened during cooling after being coiled, and the amounts of the intermetallic compounds having a particle size smaller than 0.5 μm are decreased. Therefore, the density of the intermetallic compounds having a particle size smaller than 0.5 μm fail to be 10000/mm2 or higher, and the erosion resistance is also lowered.

(Annealing Conditions)

In addition, as for the annealing conditions after hot rolling, the annealing temperature is 200° C. or higher but 450° C. or lower; the total annealing time is 1 hour or longer but 10 hours or shorter; and the cooling rate is higher than 30° C./h.

When the annealing temperature is lower than 200° C., removal of strain is insufficient, and therefore accumulated strain before the brazing heating is increased. Accordingly, the amount of recrystallization nucleus during brazing heating is increased and the crystal grains in the core material after the brazing heating thus become fine, leading to lowered erosion resistance. In addition, when the annealing temperature is higher than 450° C., dissolution of the intermetallic compounds during annealing is promoted and the amounts of the intermetallic compounds having a particle size smaller than 0.5 μm are decreased. Therefore, the density of the intermetallic compounds having a particle size smaller than 0.5 μm fails to be 10000/mm2 or higher, and erosion resistance is also lowered.

In addition, when the total annealing time is shorter than 1 hour, removal of strain is insufficient, and therefore accumulated strain before the brazing heating is increased. Therefore, the amount of recrystallization nucleus during brazing heating is increased and the crystal grains in the core material after the brazing heating thus become fine, leading to lowered erosion resistance. In addition, when the total annealing time is longer than 10 hours, the intermetallic compounds are grown and coarsened to decrease the amounts of the intermetallic compounds having a particle size smaller than 0.5 μm. Therefore, the density of the intermetallic compounds having a particle size smaller than 0.5 μm fail to be 10000/mm2 or higher, and erosion resistance is also lowered.

In addition, when the cooling rate is 30° C./h or lower, the intermetallic compounds are grown and coarsened during cooling even in a temperature range through which the compounds pass during the cooling process and the amounts of the intermetallic compounds having a particle size smaller than 0.5 μm are decreased. Therefore, the density of the intermetallic compounds having a particle size smaller than 0.5 μm fails to be 10000/mm2 or higher, and erosion resistance is also lowered.

(Controlling Conditions of Density of Intermetallic Compounds Having a Particle Size of 1.0 μm or Larger)

The particle size and density of the intermetallic compounds in the core material of the aluminum alloy brazing sheet according to the embodiment can be controlled by setting a coiling temperature after hot rolling to a predetermined temperature, and annealing under predetermined conditions at least once after the hot rolling in the manufacturing process of the brazing sheet. The details are as follows:

(Coiling Temperature in Hot Rolling)

The coiling temperature in hot rolling is lower than 360° C. That is, when the coiling temperature after hot rolling is 360° C. or higher, the intermetallic compounds are grown and coarsened during cooling after being coiled and the amount of the intermetallic compounds having a particle size of 1.0 μm or larger is increased. Consequently, the density of the intermetallic compounds having a particle size of 1.0 μm or larger fails to be lower than 5000/mm2, and erosion resistance is also lowered.

(Annealing Conditions)

In addition, as for the annealing conditions after hot rolling, the annealing temperature is 200° C. or higher but 400° C. or lower; the total annealing time is 1 hour or longer but 10 hours or shorter; and the programming rate between 150 to 200° C. is 20° C./h or higher.

When the annealing temperature is lower than 200° C., removal of strain is insufficient, and therefore accumulated strain before the brazing heating is increased. Accordingly, the amount of recrystallization nucleus during brazing heating is increased and the crystal grains in the core material after the brazing heating thus become fine, leading to lowered erosion resistance. In addition, when the annealing temperature is higher than 400° C., the intermetallic compounds are grown and coarsened during annealing and the intermetallic compounds having a particle size of 1.0 μm or larger is increased. Therefore, the density of the intermetallic compounds having a particle size of 1.0 μm or larger fails to be lower than 5000/mm2, and erosion resistance is also lowered.

In addition, when the total annealing time is shorter than 1 hour, removal of strain is insufficient, and therefore accumulated strain before the brazing heating is increased. Accordingly, the amount of recrystallization nucleus during brazing heating is increased and the crystal grains in the core material after the brazing heating thus become fine, leading to lowered erosion resistance. In addition, when the total annealing time is longer than 10 hours, the intermetallic compounds are grown and coarsened, and the amount of the intermetallic compounds having a particle size of 1.0 μm or larger is increased. Therefore, the density of the intermetallic compounds having a particle size of 1.0 μm or larger fails to be lower than 5000/mm2, and erosion resistance is also lowered.

In addition, when the rate of temperature rise from 150 to 200° C. is lower than 20° C./h, the intermetallic compounds are grown and coarsened while the temperature is raised, and the amount of the intermetallic compounds having a particle size of 1.0 μm or larger is increased. Therefore, the density of the intermetallic compounds having a particle size of 1.0 μm or larger fails to be lower than 5000/mm2, and erosion resistance is also lowered.

In any case, failing to anneal after the hot rolling leads to an increase in accumulated strain introduced into the material by cold rolling. Therefore, the amount of recrystallization nucleus during brazing heating is increased and the crystal grains in the core material after the brazing heating thus become fine, leading to lowered erosion resistance.

(Method for Producing Core Material)

The method for producing the core material is not particularly limited. For example, it can be produced by producing an ingot of an aluminum alloy for core material by using the alloy mentioned above, casting the ingot at a predetermined casting temperature, and then subjecting the ingot to a homogenizing heat treatment at a predetermined temperature for a predetermined period of time.

(Filler Material)

As for the filler material, an Al—Si-based alloy or an Al—Si—Zn-based alloy is cladded on at least one side of the core material. Specific examples of the constituents of the filler material include those described below.

(Filler Material: in Al—Si-Based Alloy, Si: 4 to 12% by Mass)

When the amount of Si is lower than 4% by mass, the ratio of the liquid phase is lowered, resulting in insufficient brazing, while when the amount of Si is higher than 12% by mass, coarse primary phase Si is generated to cause cracks during forming and working processing. Therefore, when the Al—Si-based alloy is used as a filler material, it is preferable that the amount of Si is kept within the range mentioned above.

(Filler Material: in Al—Si—Zn-Based Alloy, Si: 4 to 12% by Mass and Zn: 1 to 7% by Mass)

In order to lower the electric potential of the filler material (make the filler material less noble) to give a sacrificial anode effect to the filler material, an Al—Si—Zn-based alloy prepared by adding Zn to an Al—Si-based alloy may be used. However, when the amount of Zn is lower than 1% by mass, the degree of a decrease in the electric potential of the filler material is low, and sacrificial corrosion prevention becomes insufficient, while when the amount of Zn is higher than 7% by mass, Zn is concentrated in a portion where the filler is accumulated, which becomes a preferential corrosion site. Therefore, when an Al—Si—Zn-based alloy is used as a filler material, it is preferable to set the amounts of Si and Zn within the range mentioned above.

(Inevitable Impurities of the Filler Material)

Even if the filler material contains inevitable impurities, for example, Cr: 0.1% by mass or lower and Fe: 0.3% by mass or lower (each being higher than 0% by mass), the effects of the present invention are not prevented.

(Method for Producing Filler Material)

The method for producing the filler material is not particularly limited. For example, the filler material can be produced by using the alloy mentioned above producing an ingot of aluminum alloy for filler material, casting the ingot at a predetermined casting temperature, and then subjecting the ingot to a homogenizing heat treatment at a predetermined temperature for a predetermined period of time.

(Sacrificial Anode Material)

When the filler material is cladded on one side of the core material, the sacrificial anode material may be cladded on the other side of the core material. Al—Zn-based alloys, Al—Si—Zn-based alloys and Al—Mg—Si—Zn-based alloys may be used as this sacrificial anode material. Specific examples of the constituents of the sacrificial anode material include those described below.

(Sacrificial Anode Material: in Al—Zn-Based Alloy, Zn: 0.5 to 5.0% by Mass)

Zn lowers the electric potential of the sacrificial anode material (makes the sacrificial anode material less noble) to provide a sacrificial anode effect. However, when the amount of Zn is lower than 0.5% by mass, the sacrificial corrosion prevention effect becomes insufficient, while when the amount of Zn is higher than 5.0% by mass, the difference in electric potential between the sacrificial anode material and the core material is increased and the rate of self corrosion of the sacrificial anode material is increased, thereby failing to ensure sufficient corrosion resistance. Therefore, when an Al—Zn-based alloy is used as the sacrificial anode material, it is preferable to set the amount of Zn within the range mentioned above.

(Sacrificial Anode Material: in Al—Si—Zn-Based Alloy, Si: 0.1 to 1.0% by Mass and Zn: 1.0 to 6.0% by Mass)

Si functions to increase the strength of the sacrificial anode material. However, when the amount of Si is lower than 0.1% by mass, its effect in improving strength becomes insufficient, while when the amount of Si is higher than 1.0% by mass, the solidus temperature of the sacrificial anode material is lowered, resulting in the melting of the sacrificial anode material during brazing heating. In addition, when the amount of Zn is lower than 1.0% by mass, the sacrificial corrosion prevention effect becomes insufficient, while when the amount of Zn is higher than 6.0% by mass, the difference in electric potential between the sacrificial anode material and the core material is increased and the consumption rate of the sacrificial anode material is increased, thereby failing to ensure sufficient corrosion resistance. Therefore, when Al—Si—Zn-based alloy is used as the sacrificial anode material, it is preferable to set the amounts of Si and Zn within the range mentioned above.

(Sacrificial Anode Material: in Al—Mg—Si—Zn-Based Alloy, Mg: 1.0 to 4.0% by Mass, Si: 0.1 to 1.0% by Mass and Zn: 1.0 to 6.0% by Mass)

In the presence of Si, Mg forms Mg2Si, and improves the post-braze strength of the aluminum alloy brazing sheet. However, when the amount of Mg is lower than 1.0% by mass, its effect in improving post-braze strength is insufficient, while when the amount of Mg is higher than 4.0% by mass, the solidus temperature of the sacrificial anode material is lowered resulting the melting of the sacrificial anode material during brazing heating. In addition, when the amount of Si is lower than 0.1% by mass, its effect in improving strength becomes insufficient, while when the amount of Si is higher than 1.0 by mass, the solidus temperature of the sacrificial anode material is lowered, resulting in the melting of the sacrificial anode material during brazing heating. In addition, when the amount of Zn is lower than 1.0% by mass, the sacrificial corrosion prevention effect becomes insufficient, while when the amount of Zn is higher than 6.0% by mass, the difference in electric potential between the sacrificial anode material and the core material is increased and the rate of self corrosion of the sacrificial anode material is increased, thereby failing to ensure sufficient corrosion resistance. Therefore, when Al—Mg—Si—Zn-based alloy is used as the sacrificial anode material, it is preferable to set the amounts of Mg, Si and Zn within the range mentioned above.

The sacrificial anode material is not limited to these materials, and Al—Si—Mn—Zn-based and Al—Mg—Zn-based may be also used. In addition, since the present invention relates to the filler erosion from the filler material side to the core material, it is not affected by the alloy type of the sacrificial anode material.

(Inevitable Impurities of Sacrificial Anode Material)

Even if the sacrificial anode material contains inevitable impurities, for example, Cr: 0.1% by mass or lower, Zr: 0.2% by mass or lower and Fe: 0.3% by mass or lower (each being higher than 0% by mass), the effects of the present invention are not prevented.

(Method for Producing Sacrificial Anode Material)

The method for producing the sacrificial anode material is not particularly limited. For example, the sacrificial anode material can be produced by producing an ingot of an aluminum alloy for sacrificial anode material using the alloy mentioned above, casting the ingot at a predetermined casting temperature, and then subjecting the ingot to a homogenizing heat treatment at a predetermined temperature for a predetermined period of time.

(Aluminum Alloy Brazing Sheet)

As mentioned above, the aluminum alloy brazing sheet according to the embodiment is a two-layer or three-layer sheet produced by cladding the filler material on at least one side of the core material. In addition, the aluminum alloy brazing sheet according to the embodiment may be also, as mentioned above, a three-layer sheet produced by cladding the filler material on one side of the core material and cladding the sacrificial anode material on the other side of the core material.

(Method for Producing Aluminum Alloy Brazing Sheet)

The aluminum alloy brazing sheet according to the embodiment can be produced by combining the core material, filler material and sacrificial anode material produced by the production method mentioned above. For example, the aluminum alloy brazing sheet can be produced by stacking the filler material or sacrificial anode material on the core material, performing hot rolling of the stacked material, coiling the material at a predetermined coiling temperature, and then subjecting the coil to cold rolling, intermediate annealing and cold rolling. In addition, the aluminum alloy brazing sheet can be also produced by, after the hot rolling, coiling the material at a predetermined coiling temperature, and subjecting the coil to cold rolling and final annealing. In addition, the aluminum alloy brazing sheet can be also produced by, after the hot rolling, coiling the material at a predetermined coiling temperature, and then subjecting the coil to cold rolling, intermediate annealing, cold rolling, final annealing and the like. The cladding rate of the filler material and the sacrificial anode material is preferably in the range from 5 to 25%, for example, about 15%.

As mentioned above, the coiling temperature after the hot rolling is set to be lower than 360° C., and the annealing after the hot rolling is performed under the following conditions: annealing temperature: 200° C. or higher but 450° C. or lower; total annealing time: 1 hour or longer but 10 hours or shorter; and cooling rate: higher than 30° C./h. By annealing under such conditions, the density of the Mg—Si-based, Al—Mg—Cu-based and Al—Cu—Mg—Si-based intermetallic compounds having a particle size smaller than 0.5 µm in the core material can be controlled to be 10000/mm2 or higher.

Alternatively, the coiling temperature after the hot rolling is set to be lower than 360° C., and the annealing after the hot rolling is performed under the following conditions: annealing temperature: 200° C. or higher but 400° C. or lower, total annealing time: 1 hour or longer but 10 hours or shorter; and programming rate between 150 to 200° C.::20° C./h or higher. By annealing under such conditions, the density of the Mg—Si-based, Al—Mg—Cu-based and Al—Cu—Mg—Si-based intermetallic compounds having a particle size of 1.0 µm or larger in the core material can be controlled to be lower than 5000/mm2.

EXAMPLES

Next, as for the aluminum alloy brazing sheet according to the present invention, examples which meet the requirements of the present invention and Comparative Examples which do not meet the requirements of the present invention are compared and specifically described.

(Production of Aluminum Alloy Brazing Sheet)

A1 to A24 core materials having the compositions illustrated in Table 1, Al-10% by mass Si alloy or Al-8% by mass Si-2% by mass Zn alloy filler materials, a sacrificial anode material made of an Al-4% by mass Zn alloy were produced into ingots by DC casting, and The ingot was faced on both sides to a desired thickness. The filler material and sacrificial anode material were each subjected to a homogenizing process. The filler material, the core material and the sacrificial anode material were combined in the order stated. The cladded material was then heated at 530° C. for 4 hours, and was then hot-rolled to a thickness of 3.0 mm, and coiled at coiling temperatures illustrated in Table 3 after the hot rolling. The cladding rate of the filler material and sacrificial anode material was set to be 15%.

In addition, after the hot rolling, the material was rolled to a thickness of 0.5 mm by cold rolling, subjected to intermediate annealing under the conditions illustrated in Table 2, then formed into a plate material with a thickness of 0.25 mm by cold rolling, and finally subjected to final annealing under the conditions illustrated in Table 2. In addition, a plate material subjected to no intermediate annealing or final annealing after the hot rolling and cold rolling was also prepared.

Next, by using the aluminum alloy brazing sheet produced as mentioned above as a test sample, the density [pcs./mm2], post-braze strength, brazability, formability, corrosion resistance, crystal grain size in the post-braze core material and erosion resistance of the intermetallic compounds of the test samples were determined by the methods indicated below. The results are illustrated in Table 3. In this Example, those which were evaluated as good for all of these evaluation criteria were considered as Examples which meet the requirements of the present invention, while those which were evaluated as not good for any of these evaluation criteria were considered as Comparative Examples which do not meet the requirements of the present invention.

(Production of Aluminum Alloy Brazing Sheet)

A101 to A124 core materials having the compositions illustrated in Table 101, a filler material of an Al-10% by mass Si alloy or Al-8% by mass Si-2% by mass Zn alloy, and a sacrificial anode material of an Al-4% by mass Zn alloy were cast into an ingot by DC casting. The ingot was faced on both sides to a desired thickness. The filler material and sacrificial anode material were each subjected to a homogenizing process. The filler material, the core material and the sacrificial anode material were combined in the order stated. The cladded material was then heated at 530° C. for 4 hours, and was then hot-rolled to a thickness of 3.0 mm. The material was coiled at a coiling temperature after the hot rolling illustrated in Table 103. The cladding rate of the filler material and sacrificial anode material was set to be 15%.

In addition, after the hot rolling, the material was rolled to a thickness of 0.5 mm by cold rolling, subjected to intermediate annealing under the conditions illustrated in Table 102, and then formed into a plate material with a thickness of 0.25 mm by cold rolling. Finally, the plate material was subjected to final annealing under the conditions illustrated in Table 102. In addition, a plate material subjected to no intermediate annealing or final annealing after the hot rolling and cold rolling was also prepared.

Next, by using the aluminum alloy brazing sheet produced as mentioned above as a test sample, the density [pcs./mm2] of the intermetallic compounds of the test samples, post-braze strength, brazability, formability, corrosion resistance, crystal grain size in the post-braze core material and erosion resistance were determined by the methods indicated below. The results are illustrated in Table 103. In this Example, those which were evaluated as good on all of these evaluation criteria were considered as Examples which meet the requirements of the present invention, while those which were evaluated as not good for any of these evaluation criteria were considered as Comparative Examples which do not meet the requirements of the present invention.

(Measurement of Density [pcs./mm2] of Intermetallic Compounds)

The density of the intermetallic compounds were measured by observing the L-LT plane of the core material ground in the ST direction to the center of the core material by means of a TEM (transmission electron microscope). The observed portions were only those portions which had a thickness of 0.1 to 0.3 μm determined from their equal thickness fringes. The samples were then observed by ten visual fields at a magnification of 20000×. The density of the intermetallic compounds having a particle size smaller than 0.5 μm after brazing were determined by the image analysis of the TEM photograph of each visual field. The density of the intermetallic compounds were measured by averaging the values determined from the ten visual fields.

(Evaluation of Post-Braze Strength)

The post-braze strength were determined by subjecting the test samples to a heat treatment under conditions simulating brazing at 600° C. for 3 minutes and then retaining the test samples at room temperature for 7 days, processing the test samples into JIS No. 5 test pieces so that the stretching direction of the test pieces is parallel to the rolling direction, and performing a tensile test on the test pieces at room temperature. The test pieces with a tensile strength of 160 MPa or higher were evaluated "o" (Good), while those with a tensile strength of 160 MPa were evaluated "x" (Poor). In addition, the test pieces which were unable to be evaluated because of the dissolution of the core material after the heat treatment were evaluated "–" (evaluation not possible).

(Evaluation of Brazability)

Brazability was evaluated according to the evaluation method described in "Aluminum Blazing Handbook, Revised Edition (written by Masaru Takemoto, et. al, published by Japan Light Metal Welding & Construction Association, on March, 2003)", on pages 132 to 136. That is, a stainless steel spacer with a diameter of 2 mm is nipped between a lower plate (3003 Al alloy sheet (thickness: 1.0 mm×length: 25 mm×width: 60 mm)) laid horizontally and an upper plate (test sample (thickness: 0.3 mm×length: 25 mm×width: 55 mm)) placed perpendicular to this lower plate to set a constant clearance between the lower plate and the upper plate. In addition, a flux (FL-7 manufactured by Morita Chemical Industries Co., Ltd.,) was applied on the surface side of the filler material of the test sample of the upper plate in an amount of 5 g/m2. The test samples with a gap fill length of 15 mm or longer were evaluated "o" (Good), while those with a gap fill length shorter than 15 mm were evaluated "x" (Poor).

(Evaluation of Formability)

Formability was evaluated by performing the Erichsen test according to "JIS Z2247" before the heat treatment of the test samples in a manner of causing the test sample to bulge to the surface side of the filler material and measuring the bulge height. In addition, the test samples with a bulge height of 8 mm or shorter were evaluated "o" (Good), while those with a bulge height shorter than 8 mm were evaluated "x" (Poor).

(Evaluation of Corrosion Resistance)

Corrosion resistance was evaluated by subjecting the test samples to a heat treatment under conditions simulating brazing at 600° C. for 3 minutes, performing an immersion test of the test samples in an OY water solution for 3 months with the sacrificial anode material being the test side, and measuring corrosion depths of the test samples. In addition, the test samples with a corrosion depth less than 40 μm were evaluated "o" (Good), while those with a corrosion depth of 40 μm or more were evaluated "x" (Poor).

(Measurement and Evaluation of Crystal Grain Size of Post-Braze Core Material)

The crystal grain size of the post-braze core material was determined by performing a heat treatment under conditions simulating brazing at 600° C. for 3 minutes, cutting the test samples into suitable sizes, grinding the L-ST plane and etching the plane of the test samples with a electrolyte solution, photographing the ground surface at a magnification of 100× and observing the photographs, and measuring the grain size of crystals of the core material in the rolling direction by the mean linear intercept method. The grain size of crystals was the average of the values of five portions. In addition, test samples with a grain size of crystals of the post-braze core material of 120 μm or larger were judged "⊙" (excellent); those with a grain size of crystals of the post-braze core material of 100 μm or larger but smaller than 120 μm were evaluated "o" (good); and those with a grain size of crystals of the post-braze core material smaller than 100 μm were evaluated "x" (poor).

(Evaluation of Erosion Resistance)

Evaluation of erosion resistance was performed by cutting out test samples after brazing, embedded the test samples into resins and grinding the cross sections of the resins, and observing the ground surfaces with an optical microscope for their degrees of erosion of fillers into the core material (erosion degree). In addition, the test samples with a percentage of the core material remaining (thickness of the core material remaining in the part with the worst erosion after heat treatment equivalent to brazing/thickness of the core material before heating×100) of 70% or higher were evaluated "o" (good), while those with a percentage of the core material remaining lower than 70% were evaluated "x" (Poor).

As illustrated in Table 3, since the test samples Nos. 1 to 20 meet the requirements of the present invention, they indicate good results for post-braze strength, brazability, formability, corrosion resistance, grain size of crystals in the post-braze core material and erosion resistance. On the other hand, since the test samples Nos. 31 to 54 do not meet the requirements defined in the present invention, they indicate poor results for any of strength after brazing, brazability, formability, corrosion resistance, grain size of crystals in the post-braze core material and erosion resistance.

Specifically, since the test sample No. 31 has an amount of Si in the core material lower than 0.3% by mass, it indicated low post-braze strength. In addition, since the test sample No. 32 has an amount of Si in the core material higher than 1.0% by mass, the core material was melted during brazing and was unable to be evaluated.

Since the test sample No. 33 has an amount of Mn in the core material lower than 0.6% by mass, it indicated low post-braze strength. In addition, since the test sample No. 34 has an amount of Mn in the core material higher than 2.0% by mass, it indicated low formability.

Since the test sample No. 35 has an amount of Cu in the core material lower than 0.3% by mass, it indicated low post-braze strength. In addition, since the test sample No. 36 has an amount of Cu in the core material higher than 1.0% by mass, the core material was melted during brazing and was unable to be evaluated.

Since the test sample No. 37 has an amount of Mg in the core material lower than 0.15% by volume, it indicated low post-braze strength. In addition, since the test sample No. 38 has an amount of Mg in the core material higher than 0.5% by mass, it indicated low brazability.

Since the test sample No. 39 has an amount of Ti in the core material lower than 0.05% by volume, it indicated low corrosion resistance. In addition, since the test sample No. 40 has an amount of Ti in the core material higher than 0.25% by mass, it indicated low formability.

In the test samples Nos. 41 to 52, the annealing conditions in the intermediate annealing or final annealing do not meet any of the following conditions: temperature range: 200° C. or higher but 450° C. or lower; total annealing time: 1 hour or longer but 10 hours or shorter; and cooling rate: higher than 30° C./h. Therefore, the density of the intermetallic compounds having a particle size smaller than 0.5 μm failed to be 10000/mm2 or higher, and their erosion resistance was also low.

Since the test sample No. 53 has a coiling temperature after hot rolling of 360° C. or higher, the density of the intermetallic compounds having a particle size smaller than 0.5 μm failed to be 10000/mm2 or higher, and their erosion resistance was also low.

As illustrated in Table 103, since the test samples Nos. 101 to 120 meet the requirements of the present invention, they indicated good results for post-braze strength, brazability, formability, corrosion resistance, grain size of crystals in the post-braze core material and erosion resistance. On the other hand, since the test samples Nos. 131 to 154 do not meet the requirements defined in the present invention, they indicated poor results for any of strength after brazing, brazability, formability, corrosion resistance, grain size of crystals in the post-braze core material and erosion resistance.

Specifically, since the test sample No. 131 has an amount of Si in the core material lower than 0.3% by mass, it indicated low post-braze strength. In addition, since the test sample No. 132 has an amount of Si in the core material higher than 1.0% by mass, the core material was fused during brazing heating and was unable to be evaluated.

Since the test sample No. 133 has an amount of Mn in the core material lower than 0.6% by mass, it indicated low post-braze strength. In addition, since the test sample No. 134 has an amount of Mn in the core material higher than 2.0% by mass, it indicated low formability.

Since the test sample No. 135 has an amount of Cu in the core material lower than 0.3% by mass, it indicated low post-braze strength. In addition, since the test sample No. 136 has an amount of Cu in the core material higher than 1.0% by mass, the core material was fused during brazing heating and was unable to be evaluated.

Since the test sample No. 137 has an amount of Mg in the core material lower than 0.15% by volume, it indicated low post-braze strength. In addition, since the test sample No. 138 has an amount of Mg in the core material higher than 0.5% by mass, it indicated low brazability.

Since the test sample No. 139 has an amount of Ti in the core material lower than 0.05% by volume, it indicated low corrosion resistance. In addition, since the test sample No. 140 has an amount of Ti in the core material higher than 0.25% by mass, it indicated low formability.

In the test samples Nos. 141 to 152, the annealing conditions in the intermediate annealing or final annealing do not meet any of the following conditions: temperature range: 200° C. or higher but 400° C. or lower, total annealing time: 1 hour or longer but 10 hours or shorter, the rate of temperature rise from 150 to 200° C.: 20° C./h or higher. Therefore, the density of the intermetallic compounds having a particle size of 1.0 μm or larger fail to be lower than 5000/mm2, and their erosion resistance was also low.

Since the test sample No. 153 has a coiling temperature after hot rolling of 360° C. or higher, the density of the intermetallic compounds having a particle size of 1.0 μm or larger fail to be lower than 5000/mm2, and their erosion resistance was also low.

The aluminum alloy brazing sheet according to the present invention has been specifically described above with reference to Best Mode for Carrying out the Invention and Examples. However, the purport of the present invention is not limited to these descriptions, and should be widely interpreted based on the description of claims. In addition, it goes without saying that the purport of the present invention covers those with various changes and modification based on these descriptions.

TABLE 1

Chemical composition of core material (% by mass, Remainder: Al and other inevitable impurities).

| Symbol | Si | Mn | Cu | Mg | Ti | Remarks |
|---|---|---|---|---|---|---|
| A1 | 0.40 | 1.90 | 0.60 | 0.35 | 0.15 | Materials of invention |
| A2 | 0.80 | 0.75 | 0.35 | 0.25 | 0.07 | |
| A3 | 0.50 | 1.30 | 0.40 | 0.40 | 0.15 | |
| A4 | 0.35 | 1.10 | 0.50 | 0.20 | 0.15 | |
| A5 | 0.95 | 1.10 | 0.50 | 0.20 | 0.15 | |
| A6 | 0.70 | 1.10 | 0.50 | 0.15 | 0.15 | |
| A7 | 0.70 | 1.10 | 0.50 | 0.45 | 0.15 | |
| A8 | 0.35 | 1.10 | 0.50 | 0.15 | 0.15 | |
| A9 | 0.95 | 1.10 | 0.50 | 0.45 | 0.15 | |
| A15 | 0.25 | 1.10 | 0.50 | 0.20 | 0.15 | Comparative Materials |
| A16 | 1.10 | 1.10 | 0.50 | 0.20 | 0.15 | |
| A17 | 0.70 | 0.55 | 0.50 | 0.20 | 0.15 | |
| A18 | 0.70 | 2.10 | 0.50 | 0.20 | 0.15 | |
| A19 | 0.70 | 1.10 | 0.25 | 0.20 | 0.15 | |

TABLE 1-continued

Chemical composition of core material (% by mass, Remainder: Al and other inevitable impurities).

| Symbol | Si | Mn | Cu | Mg | Ti | Remarks |
|---|---|---|---|---|---|---|
| A20 | 0.70 | 1.10 | 1.10 | 0.20 | 0.15 | |
| A21 | 0.70 | 1.10 | 0.50 | 0.10 | 0.15 | |
| A22 | 0.70 | 1.10 | 0.50 | 0.55 | 0.15 | |
| A23 | 0.70 | 1.10 | 0.50 | 0.20 | 0.01 | |
| A24 | 0.70 | 1.10 | 0.50 | 0.20 | 0.45 | |

TABLE 2

| Symbol | Annealing conditions | | |
|---|---|---|---|
| | Temp. [° C.] | Hours [h] | Cooling rate [° C./h] |
| C1 | 300 | 3 | 35 |
| C2 | 300 | 3 | 100 |
| C3 | 300 | 6 | 40 |
| C4 | 300 | 10 | 35 |
| C5 | 210 | 3 | 50 |
| C6 | 440 | 3 | 50 |
| C7 | 190 | 3 | 45 |
| C8 | 460 | 3 | 35 |
| C9 | 300 | 3 | 10 |
| C10 | 300 | 11 | 35 |

TABLE 3

| No | Filler material | Core material | Coiling temp. after hot-rolling [° C.] | Intermediate annealing conditions | Final annealing conditions | Density of intermetallic compound [pcs./mm$^2$] | Post-braze strength | Brazability | Formability | Corrosion resistance | Post-braze crystal grain size of core material [μm] | Erosion resistance | Remarks |
|---|---|---|---|---|---|---|---|---|---|---|---|---|---|
| 1 | Al-10% by mass Si | A1 | 330 | C1 | C1 | 22000 | ○ | ○ | ○ | ○ | ◎ | ○ | Ex. |
| 2 | Al-10% by mass Si | A2 | 350 | C1 | C1 | 19500 | ○ | ○ | ○ | ○ | ◎ | ○ | |
| 3 | Al-10% by mass Si | A3 | 270 | C1 | C1 | 20000 | ○ | ○ | ○ | ○ | ◎ | ○ | |
| 4 | Al-10% by mass Si | A4 | 350 | C1 | C1 | 23000 | ○ | ○ | ○ | ○ | ◎ | ○ | |
| 5 | Al-10% by mass Si | A5 | 270 | C1 | C1 | 18000 | ○ | ○ | ○ | ○ | ◎ | ○ | |
| 6 | Al-10% by mass Si | A6 | 330 | C1 | C1 | 21000 | ○ | ○ | ○ | ○ | ◎ | ○ | |
| 7 | Al-10% by mass Si | A7 | 330 | C1 | C1 | 18000 | ○ | ○ | ○ | ○ | ◎ | ○ | |
| 8 | Al-10% by mass Si | A8 | 270 | C1 | C1 | 24000 | ○ | ○ | ○ | ○ | ◎ | ○ | |
| 9 | Al-10% by mass Si | A9 | 350 | C1 | C1 | 17000 | ○ | ○ | ○ | ○ | ◎ | ○ | |
| 10 | Al-10% by mass Si | A1 | 330 | C1 | C2 | 26000 | ○ | ○ | ○ | ○ | ◎ | ○ | |
| 11 | Al-10% by mass Si | A1 | 330 | C1 | C3 | 12000 | ○ | ○ | ○ | ○ | ○ | ○ | |
| 12 | Al-10% by mass Si | A1 | 330 | C1 | C5 | 28000 | ○ | ○ | ○ | ○ | ◎ | ○ | |
| 13 | Al-10% by mass Si | A1 | 270 | C1 | C6 | 16000 | ○ | ○ | ○ | ○ | ◎ | ○ | |
| 14 | Al-10% by mass Si | A1 | 330 | C6 | C1 | 16000 | ○ | ○ | ○ | ○ | ◎ | ○ | |
| 15 | Al-10% by mass Si | A1 | 350 | C6 | C6 | 15000 | ○ | ○ | ○ | ○ | ◎ | ○ | |
| 16 | Al-10% by mass Si | A1 | 270 | C1 | — | 30000 | ○ | ○ | ○ | ○ | ◎ | ○ | |
| 17 | Al-10% by mass Si | A1 | 270 | C4 | — | 11000 | ○ | ○ | ○ | ○ | ○ | ○ | |
| 18 | Al-10% by mass Si | A1 | 330 | — | C1 | 30000 | ○ | ○ | ○ | ○ | ◎ | ○ | |
| 19 | Al-10% by mass Si | A1 | 350 | — | C4 | 11000 | ○ | ○ | ○ | ○ | ○ | ○ | |
| 20 | Al-8% by mass Si-2% by mass Zn | A1 | 350 | C1 | C1 | 22000 | ○ | ○ | ○ | ○ | ◎ | ○ | |
| 31 | Al-10% by mass Si | A15 | 350 | C1 | C1 | 27000 | X | ○ | ○ | ○ | ◎ | ○ | Comp. Ex. |
| 32 | Al-10% by mass Si | A16 | 330 | C1 | C1 | — | melted | — | — | — | — | — | |
| 33 | Al-10% by mass Si | A17 | 330 | C1 | C1 | 20000 | X | ○ | ○ | ○ | ◎ | ○ | |
| 34 | Al-10% by mass Si | A18 | 350 | C1 | C1 | 20000 | ○ | ○ | X | ○ | ◎ | ○ | |
| 35 | Al-10% by mass Si | A19 | 270 | C1 | C1 | 20000 | X | ○ | ○ | ○ | ◎ | ○ | |
| 36 | Al-10% by mass Si | A20 | 270 | C1 | C1 | — | melted | — | — | — | — | — | |
| 37 | Al-10% by mass Si | A21 | 350 | C1 | C1 | 22000 | X | ○ | ○ | ○ | ◎ | ○ | |
| 38 | Al-10% by mass Si | A22 | 350 | C1 | C1 | 18000 | ○ | X | ○ | ○ | ◎ | ○ | |
| 39 | Al-10% by mass Si | A23 | 330 | C1 | C1 | 20000 | ○ | ○ | ○ | X | ◎ | ○ | |
| 40 | Al-10% by mass Si | A24 | 270 | C1 | C1 | 20000 | ○ | ○ | X | ○ | ◎ | ○ | |
| 41 | Al-10% by mass Si | A1 | 350 | C7 | C1 | 6000 | ○ | ○ | ○ | ○ | X | X | |
| 42 | Al-10% by mass Si | A1 | 350 | C8 | C1 | 4000 | ○ | ○ | ○ | ○ | X | X | |
| 43 | Al-10% by mass Si | A1 | 270 | C9 | C1 | 3000 | ○ | ○ | ○ | ○ | X | X | |
| 44 | Al-10% by mass Si | A1 | 270 | C10 | C1 | 100 | ○ | ○ | ○ | ○ | X | X | |
| 45 | Al-10% by mass Si | A1 | 270 | C1 | C8 | 4000 | ○ | ○ | ○ | ○ | X | X | |
| 46 | Al-10% by mass Si | A1 | 350 | C8 | C8 | 2000 | ○ | ○ | ○ | ○ | X | X | |
| 47 | Al-10% by mass Si | A1 | 350 | C8 | — | 8000 | ○ | ○ | ○ | ○ | X | X | |
| 48 | Al-10% by mass Si | A1 | 350 | C10 | — | 1000 | ○ | ○ | ○ | ○ | X | X | |
| 49 | Al-10% by mass Si | A1 | 270 | — | C8 | 8000 | ○ | ○ | ○ | ○ | X | X | |
| 50 | Al-10% by mass Si | A1 | 270 | — | C10 | 1000 | ○ | ○ | ○ | ○ | X | X | |
| 51 | Al-8% by mass Si-2% by mass Zn | A1 | 330 | C7 | C1 | 6000 | ○ | ○ | ○ | ○ | X | X | |
| 52 | Al-10% by mass Si | A1 | 330 | C3 | C3 | 500 | ○ | ○ | ○ | ○ | X | X | |
| 53 | Al-10% by mass Si | A1 | 390 | C1 | C1 | 9000 | ○ | ○ | ○ | ○ | X | X | |

TABLE 101

Chemical composition of core material (% by mass, Remainder: Al and other inevitable impurities)

| Symbol | Si | Mn | Cu | Mg | Ti | Remarks |
|---|---|---|---|---|---|---|
| A101 | 0.55 | 1.25 | 0.90 | 0.15 | 0.20 | Materials of invention |
| A102 | 0.95 | 1.80 | 0.40 | 0.30 | 0.06 | |
| A103 | 0.40 | 0.75 | 0.40 | 0.40 | 0.20 | |
| A104 | 0.30 | 1.70 | 0.35 | 0.25 | 0.20 | |
| A105 | 0.95 | 1.70 | 0.35 | 0.25 | 0.20 | |
| A106 | 0.80 | 1.70 | 0.35 | 0.25 | 0.20 | |
| A107 | 0.80 | 1.70 | 0.35 | 0.25 | 0.20 | |
| A108 | 0.30 | 1.70 | 0.35 | 0.25 | 0.20 | |
| A109 | 0.95 | 1.70 | 0.35 | 0.25 | 0.20 | |
| A115 | 0.25 | 1.70 | 0.35 | 0.25 | 0.20 | Comparative Materials |
| A116 | 1.10 | 1.70 | 0.35 | 0.25 | 0.20 | |
| A117 | 0.80 | 0.55 | 0.35 | 0.25 | 0.20 | |
| A118 | 0.80 | 2.10 | 0.35 | 0.25 | 0.20 | |
| A119 | 0.80 | 1.70 | 0.25 | 0.25 | 0.20 | |
| A120 | 0.80 | 1.70 | 1.10 | 0.25 | 0.20 | |
| A121 | 0.80 | 1.70 | 0.35 | 0.10 | 0.20 | |
| A122 | 0.80 | 1.70 | 0.35 | 0.55 | 0.20 | |
| A123 | 0.80 | 1.70 | 0.35 | 0.25 | 0.01 | |
| A124 | 0.80 | 1.70 | 0.35 | 0.25 | 0.45 | |

TABLE 102

| | Annealing conditions | | |
|---|---|---|---|
| Symbol | Temperature [°C.] | Time [h] | The rate of temperature rise from 150 to 200° C. [° C./h] |
| B101 | 300 | 3 | 30 |
| B102 | 300 | 3 | 100 |
| B103 | 300 | 6 | 35 |
| B104 | 300 | 10 | 30 |
| B105 | 210 | 3 | 45 |
| B106 | 390 | 3 | 50 |
| B107 | 190 | 3 | 30 |
| B108 | 410 | 3 | 35 |
| B109 | 300 | 3 | 10 |
| B110 | 300 | 11 | 30 |

TABLE 103

| No | Filler material | Core material | Coiling temp. after hot-rolling [°C.] | Intermediate annealing conditions | Final annealing conditions | Density of intermetallic compound [pcs./mm²] | Post-braze strength | Brazability | Formability | Corrosion resistance | Post-braze crystal grain size of core material [μm] | Erosion resistance | Remarks |
|---|---|---|---|---|---|---|---|---|---|---|---|---|---|
| 101 | Al-10% by mass Si | A101 | 310 | B101 | B101 | 2600 | ○ | ○ | ○ | ○ | ◎ | ○ | Ex. |
| 102 | Al-10% by mass Si | A102 | 260 | B101 | B101 | 3100 | ○ | ○ | ○ | ○ | ◎ | ○ | |
| 103 | Al-10% by mass Si | A103 | 350 | B101 | B101 | 2700 | ○ | ○ | ○ | ○ | ◎ | ○ | |
| 104 | Al-10% by mass Si | A104 | 310 | B101 | B101 | 2500 | ○ | ○ | ○ | ○ | ◎ | ○ | |
| 105 | Al-10% by mass Si | A105 | 350 | B101 | B101 | 2900 | ○ | ○ | ○ | ○ | ◎ | ○ | |
| 106 | Al-10% by mass Si | A106 | 350 | B101 | B101 | 2800 | ○ | ○ | ○ | ○ | ◎ | ○ | |
| 107 | Al-10% by mass Si | A107 | 350 | B101 | B101 | 2800 | ○ | ○ | ○ | ○ | ◎ | ○ | |
| 108 | Al-10% by mass Si | A108 | 310 | B101 | B101 | 2500 | ○ | ○ | ○ | ○ | ◎ | ○ | |
| 109 | Al-10% by mass Si | A109 | 350 | B101 | B101 | 2900 | ○ | ○ | ○ | ○ | ◎ | ○ | |
| 110 | Al-10% by mass Si | A101 | 260 | B101 | B102 | 2400 | ○ | ○ | ○ | ○ | ◎ | ○ | |
| 111 | Al-10% by mass Si | A101 | 350 | B101 | B103 | 4000 | ○ | ○ | ○ | ○ | ○ | ○ | |
| 112 | Al-10% by mass Si | A101 | 260 | B101 | B105 | 2200 | ○ | ○ | ○ | ○ | ◎ | ○ | |
| 113 | Al-10% by mass Si | A101 | 310 | B101 | B106 | 3500 | ○ | ○ | ○ | ○ | ◎ | ○ | |
| 114 | Al-10% by mass Si | A101 | 310 | B106 | B101 | 3500 | ○ | ○ | ○ | ○ | ◎ | ○ | |
| 115 | Al-10% by mass Si | A101 | 260 | B106 | B106 | 3700 | ○ | ○ | ○ | ○ | ◎ | ○ | |
| 116 | Al-10% by mass Si | A101 | 350 | B101 | — | 500 | ○ | ○ | ○ | ○ | ◎ | ○ | |
| 117 | Al-10% by mass Si | A101 | 310 | B104 | — | 4500 | ○ | ○ | ○ | ○ | ○ | ○ | |
| 118 | Al-10% by mass Si | A101 | 310 | — | B101 | 500 | ○ | ○ | ○ | ○ | ◎ | ○ | |
| 119 | Al-10% by mass Si | A101 | 310 | — | B104 | 4500 | ○ | ○ | ○ | ○ | ○ | ○ | |
| 120 | Al-8% by mass Si-2% by mass Zn | A101 | 260 | B101 | B101 | 2600 | ○ | ○ | ○ | ○ | ◎ | ○ | |
| 131 | Al-10% by mass Si | A115 | 350 | B101 | B101 | 2500 | X | ○ | ○ | ○ | ◎ | ○ | Comp. Ex. |
| 132 | Al-10% by mass Si | A116 | 260 | B101 | B101 | — | melted | — | — | — | — | — | |
| 133 | Al-10% by mass Si | A117 | 260 | B101 | B101 | 2800 | X | ○ | ○ | ○ | ◎ | ○ | |
| 134 | Al-10% by mass Si | A118 | 310 | B101 | B101 | 2800 | ○ | ○ | X | ○ | ◎ | ○ | |
| 135 | Al-10% by mass Si | A119 | 350 | B101 | B101 | 2800 | X | ○ | ○ | ○ | ◎ | ○ | |
| 136 | Al-10% by mass Si | A120 | 350 | B101 | B101 | — | melted | — | — | — | — | — | |
| 137 | Al-10% by mass Si | A121 | 260 | B101 | B101 | 2500 | X | ○ | ○ | ○ | ◎ | ○ | |
| 138 | Al-10% by mass Si | A122 | 350 | B101 | B101 | 3000 | ○ | X | ○ | ○ | ◎ | ○ | |
| 139 | Al-10% by mass Si | A123 | 310 | B101 | B101 | 2800 | ○ | ○ | ○ | X | ◎ | ○ | |
| 140 | Al-10% by mass Si | A124 | 260 | B101 | B101 | 2800 | ○ | ○ | X | ○ | ◎ | ○ | |
| 141 | Al-10% by mass Si | A101 | 260 | B107 | B101 | 7000 | ○ | ○ | ○ | ○ | X | X | |
| 142 | Al-10% by mass Si | A101 | 310 | B108 | B101 | 14000 | ○ | ○ | ○ | ○ | X | X | |
| 143 | Al-10% by mass Si | A101 | 310 | B109 | B101 | 8000 | ○ | ○ | ○ | ○ | X | X | |
| 144 | Al-10% by mass Si | A101 | 310 | B110 | B101 | 20000 | ○ | ○ | ○ | ○ | X | X | |
| 145 | Al-10% by mass Si | A101 | 350 | B101 | B108 | 14000 | ○ | ○ | ○ | ○ | X | X | |
| 146 | Al-10% by mass Si | A101 | 260 | B108 | B108 | 17500 | ○ | ○ | ○ | ○ | X | X | |

TABLE 103-continued

| No | Filler material | Core material | Conditions Coiling temp. after hot-rolling [° C.] | Intermediate annealing conditions | Final annealing conditions | Density of intermetallic compound [pcs./mm²] | Evaluation Post-braze strength | Brazability | Formability | Corrosion resistance | Post-braze crystal grain size of core material [μm] | Erosion resistance | Remarks |
|---|---|---|---|---|---|---|---|---|---|---|---|---|---|
| 147 | Al-10% by mass Si | A101 | 260 | B108 | — | 10000 | ○ | ○ | ○ | ○ | X | X | |
| 148 | Al-10% by mass Si | A101 | 260 | B110 | — | 18000 | ○ | ○ | ○ | ○ | X | X | |
| 149 | Al-10% by mass Si | A101 | 350 | — | B108 | 10000 | ○ | ○ | ○ | ○ | X | X | |
| 150 | Al-10% by mass Si | A101 | 350 | — | B110 | 18000 | ○ | ○ | ○ | ○ | X | X | |
| 151 | Al-8% by mass Si-2% by mass Zn | A101 | 350 | B107 | B101 | 8000 | ○ | ○ | ○ | ○ | X | X | |
| 152 | Al-10% by mass Si | A101 | 350 | B103 | B103 | 19000 | ○ | ○ | ○ | ○ | X | X | |
| 153 | Al-10% by mass Si | A101 | 400 | B101 | B101 | 12000 | ○ | ○ | ○ | ○ | X | X | |

The invention claimed is:

1. An aluminum alloy brazing sheet comprising an Al—Si-based or Al—Si—Zn-based filler material cladded on at least one side of a core material,
the core material comprising Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities, and
the density of an Mg—Si-based, an Al—Mg—Cu-based and an Al—Cu—Mg—Si-based intermetallic compounds having a particle size smaller than 0.5 μm in the core material being 10000/mm2 or higher.

2. An aluminum alloy brazing sheet comprising an Al—Si-based or Al—Si—Zn-based filler material cladded on at least one side of a core material,
the core material comprising Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities, and
the density of the Mg—Si-based, Al—Mg—Cu-based and Al—Cu—Mg—Si-based intermetallic compounds having a particle size of 1.0 μm or larger in the core material being lower than 5000/mm2.

3. An aluminum alloy brazing sheet comprising an Al—Si-based or Al—Si—Zn-based filler material cladded on one side of the core material and a sacrificial anode material cladded on the other side of the core material,
the core material comprising Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities,
the density of an Mg—Si-based, an Al—Mg—Cu-based and an Al—Cu—Mg—Si-based intermetallic compounds having a particle size smaller than 0.5 μm in the core material being 10000/mm2 or higher.

4. An aluminum alloy brazing sheet comprising an Al—Si-based or Al—Si—Zn-based filler material cladded on one side of the core material and a sacrificial anode material cladded on the other side of the core material,
the core material comprising Si: 0.3 to 1.0% by mass, Mn: 0.6 to 2.0% by mass, Cu: 0.3 to 1.0% by mass, Mg: 0.15 to 0.5% by mass, Ti: 0.05 to 0.25% by mass, with the remainder being Al and inevitable impurities,
the density of the Mg—Si-based, Al—Mg—Cu-based and Al—Cu—Mg—Si-based intermetallic compounds having a particle size of 1.0 μm or larger in the core material being lower than 5000/mm2.

5. The aluminum alloy brazing sheet according to claim 1, wherein the core material comprises Si: 0.3 to 0.95% by mass, Mn: 0.75 to 1.70% by mass, Cu: 0.35 to 0.90% by mass, Mg: 0.15 to 0.4% by mass, Ti: 0.06 to 0.2% by mass, with the remainder being Al and inevitable impurities.

6. The aluminum alloy brazing sheet according to claim 2, wherein the core material comprises Si: 0.3 to 0.95% by mass, Mn: 0.75 to 1.70% by mass, Cu: 0.35 to 0.90% by mass, Mg: 0.15 to 0.4% by mass, Ti: 0.06 to 0.2% by mass, with the remainder being Al and inevitable impurities.

7. The aluminum alloy brazing sheet according to claim 3, wherein the core material comprises Si: 0.3 to 0.95% by mass, Mn: 0.75 to 1.70% by mass, Cu: 0.35 to 0.90% by mass, Mg: 0.15 to 0.4% by mass, Ti: 0.06 to 0.2% by mass, with the remainder being Al and inevitable impurities.

8. The aluminum alloy brazing sheet according to claim 4, wherein the core material comprises Si: 0.3 to 0.95% by mass, Mn: 0.75 to 1.70% by mass, Cu: 0.35 to 0.90% by mass, Mg: 0.15 to 0.4% by mass, Ti: 0.06 to 0.2% by mass, with the remainder being Al and inevitable impurities.

* * * * *